US012763258B2

(12) United States Patent
Kang et al.

(10) Patent No.: US 12,763,258 B2
(45) Date of Patent: Oct. 13, 2026

(54) MULTILAYER ELECTRONIC COMPONENT WITH PROTECTIVE LAYER DISPOSED ON A CORNER

(71) Applicant: SAMSUNG ELECTRO-MECHANICS CO., LTD., Suwon-si (KR)

(72) Inventors: Bum Suk Kang, Suwon-si (KR); Dae Woo Yoon, Suwon-si (KR); Da Mi Kim, Suwon-si (KR); Su Jin Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 296 days.

(21) Appl. No.: 18/386,090

(22) Filed: Nov. 1, 2023

(65) Prior Publication Data

US 2024/0194403 A1 Jun. 13, 2024

(30) Foreign Application Priority Data

Dec. 13, 2022 (KR) ........................ 10-2022-0173266
Apr. 20, 2023 (KR) ........................ 10-2023-0052140

(51) Int. Cl.
*H01G 4/232* (2006.01)
*H01G 4/30* (2006.01)
*H01G 4/12* (2006.01)

(52) U.S. Cl.
CPC ............. *H01G 4/2325* (2013.01); *H01G 4/30* (2013.01); *H01G 4/12* (2013.01)

(58) Field of Classification Search
CPC ............................. H01G 4/2325; H01G 4/232
See application file for complete search history.

(56) References Cited

U.S. PATENT DOCUMENTS

2009/0323253 A1 12/2009 Kobayashi et al.
2014/0376155 A1 12/2014 Omori et al.
2015/0243439 A1* 8/2015 Kwag .................... H05K 1/181 361/301.4
2020/0273621 A1* 8/2020 Yi .......................... H01G 4/248

FOREIGN PATENT DOCUMENTS

JP 2002163928 A * 6/2002 ............... C03C 8/04
JP 5282634 B2 6/2013
KR 10-2014-0129189 A 11/2014

OTHER PUBLICATIONS

Translation JP 2002163928A (no date).*

* cited by examiner

*Primary Examiner* — Eric W Thomas
(74) *Attorney, Agent, or Firm* — Morgan, Lewis & Bockius LLP

(57) ABSTRACT

A protective layer including glass may be disposed between an end of a first electrode layer in contact with one end of an internal electrode and a body thereby blocking a penetration path of external moisture, a plating solution, and hydrogen to improve the moisture resistance reliability of a multilayer electronic component.

50 Claims, 9 Drawing Sheets

| | NI SAMPLE | CONTACT ANGLE | CU SAMPLE | CONTACT ANGLE | BT SAMPLE | CONTACT ANGLE |
|---|---|---|---|---|---|---|
| COMPARATIVE EXAMPLE |  | 23° |  | 26° |  | 38° |
| INVENTIVE EXAMPLE |  | 22° |  | 50° |  | 22° |

MULTILAYER ELECTRONIC COMPONENT WITH PROTECTIVE LAYER DISPOSED ON A CORNER

CROSS-REFERENCE TO RELATED APPLICATION (S)

This application claims benefit of priority to Korean Patent Application Nos. 10-2022-0173266 and 10-2023-0052140 filed on Dec. 13, 2022, and Apr. 20, 2023, respectively, in the Korean Intellectual Property Office, the disclosures of which are incorporated herein by reference in their entirety.

TECHNICAL FIELD

The present disclosure relates to a multilayer electronic component.

A multilayer ceramic capacitor (MLCC), a multilayer electronic component, is a chip-type capacitor mounted on the printed circuit boards of various electronic products including display devices such as liquid crystal displays (LCDs) and plasma display panels (PDPs), computers, smartphones, mobile phones, and the like, to serve to charge and discharge electricity therein and therefrom.

Chip components are also required to be miniaturized due to the miniaturization, slimming, and multifunctionalization of electronic products, and electronic components are also mounted with high integration. In response to this trend, a space between mounted electronic components has been minimized.

In the multilayer electronic component, a primary electrode of an external electrode may be formed by mixing a conductive metal and a glass. In this case, glass may serve to promote low-temperature sintering during a sintering process and may fill pores between conductive metal particles at the same time, and to improve interfacial bonding strength between a body having a ceramic material including Ba and Ti as a main component, and an external electrode. However, glass and conductive metal, which are mainly composed of ceramic materials, do not have sufficient wettability, and accordingly, an interface portion between the conductive metal and the glass may be a path for external moisture penetration.

Furthermore, depending on a manufacturing method, a primary electrode may be formed at a corner of the body to be thinner than a surrounding area thereof, and a boundary portion between the primary electrode and the corner of the body may be a main path for penetration of a plating solution or external moisture.

Accordingly, structural improvement is required to improve the reliability of the multilayer electronic components by blocking the path for penetration of external moisture.

SUMMARY

An aspect of the present disclosure is to solve the problem in which the wettability of a conductive metal and glass included in a primary electrode was insufficient.

An aspect of the present disclosure is to solve the problem in which moisture resistance reliability of a multiplayer electronic component is degraded by configuring a boundary portion between a corner of a body and a primary electrode to be a main penetration path of a plating solution or external moisture.

However, the aspects of the present disclosure are not limited to the above-described contents, and may be more easily understood in the process of describing specific embodiments of the present disclosure.

According to an aspect of the present disclosure, a multilayer electronic component includes: a body including: a dielectric layer, and first and second internal electrodes alternately arranged with the dielectric layer interposed therebetween in a first direction, where the body includes: first and second surfaces opposing each other in the first direction, third and fourth surfaces opposing each other in a second direction and connected to the first and second surfaces, and fifth and sixth surfaces opposing each other in a third direction and connected to the first to fourth surfaces, a first corner connecting the third surface to the first, second, fifth, and sixth surfaces, and a second corner for connecting the fourth surface to the first, second, fifth and sixth surfaces; a first external electrode disposed on the third surface, the first external electrode including a first-first electrode layer disposed on the third surface and the first corner, and a first-second electrode layer disposed on the first-first electrode layer and extends to a portion of the first, second, fifth, and sixth surfaces; and a second external electrode disposed on the fourth surface, the second external electrode including a second-first electrode layer disposed on the fourth surface and the second corner, and a second-second electrode layer disposed on the second-first electrode layer and extends to a portion of the first, second, fifth, and sixth surfaces; and a protective layer including a first glass and disposed between the first-first electrode layer and the first corner and between the second-first electrode layer and the second corner, where the protective layer is disposed to be spaced apart from: (i) an extension line extending along the first direction and from a first end of the first internal electrode, the first end is closer to the fourth surface than to the third surface, and (ii) an extension line extending along the first direction and from a second end of the second internal electrode, the second end is closer to the third surface than to the fourth surface.

According to an aspect of the present disclosure, a multilayer electronic component includes: a body including: a dielectric layer, and first and second internal electrodes alternately arranged with the dielectric layer in a first direction, the body including: first and second surfaces opposing each other in the first direction, third and fourth surfaces opposing each other in a second direction and connected to the first and second surfaces, and fifth and sixth surfaces opposing each other in a third direction and connected to the first to fourth surfaces; and an external electrode disposed on the third and fourth surfaces, the external electrode including a first electrode layer including Ni and disposed on the third and fourth surfaces to come into contact with a second directional end of the first and second internal electrodes, and a second electrode layer including Cu and extending from the first electrode layer to a portion of the first, second, fifth, and sixth surfaces, and a protective layer including a first glass that includes at least one of Na and Fe, where the protective layer is disposed between an end of the first electrode layer and the body.

According to an aspect of the present disclosure, a multilayer electronic component includes: a body including: a dielectric layer, and first and second internal electrodes alternately arranged with the dielectric layer in in a first direction, where the body includes first and second surfaces opposing each other in the first direction, third and fourth surfaces opposing each other in a second direction and connected to the first and second surfaces, and fifth and sixth surfaces opposing each other in a third direction and connected to the first to fourth surfaces; an external electrode disposed on the third and fourth surfaces, the external electrodes including a first electrode layer including a first conductive metal and disposed on the third surface and the fourth surface to come into contact with a second directional end of the first and second internal electrodes, and a second electrode layer including a second conductive metal and a second glass, and extending from the first electrode layer to a portion of the first, second, fifth, and sixth surfaces, and a protective layer including a first glass disposed between the body and an end of the first electrode layer, where wettability of the second glass with respect to the first conductive metal is greater than that of the second glass with respect to the second conductive metal.

According to an aspect of the present disclosure, a multilayer electronic component includes: a body including: a dielectric layer, and first and second internal electrodes alternately arranged with the dielectric layer in a first direction, an external electrode disposed on the body, the external electrode including: a first electrode layer including a first conductive metal and disposed on the body to come into contact with a second directional end of the first and second internal electrodes, and a second electrode layer including a second conductive metal and disposed on the first electrode layer, and a protective layer including a first glass that includes Fe, wherein the protective layer is disposed between an end of the first electrode layer and the body.

According to an aspect of the present disclosure, a multilayer electronic component includes: a body including: a dielectric layer, and first and second internal electrodes alternately arranged with the dielectric layer in a first direction, an external electrode disposed on the body, the external electrode including: a first electrode layer including a first conductive metal and disposed on the body to come into contact with a second directional end of the first and second internal electrodes, and a second electrode layer including a second conductive metal and a second glass, and disposed on the first electrode layer, and a protective layer including a first glass that includes Fe, wherein the protective layer is disposed between the body and an end of the first electrode layer, wherein wettability of the second glass with respect to the first conductive metal is greater than that of the second glass with respect to the second conductive metal.

One of the various effects of the present disclosure is to improve the wettability of a conductive metal and glass included in a primary electrode, thereby improving moisture resistance reliability of a multilayer electronic component.

One of the various effects of the present disclosure is to form a protective layer including glass on the boundary between a corner of a body and a primary electrode, thereby improving moisture resistance of a multilayer electronic component.

However, various useful advantages and effects of the present disclosure are not limited to the aforementioned content and may be relatively easily understood in a process of describing exemplary embodiments of the present disclosure.

BRIEF DESCRIPTION OF DRAWINGS

The above and other aspects, features, and advantages of the present disclosure will be more clearly understood from the detailed following description, taken in conjunction with the accompanying drawings, in which.

DETAILED DESCRIPTION

Figure 1:
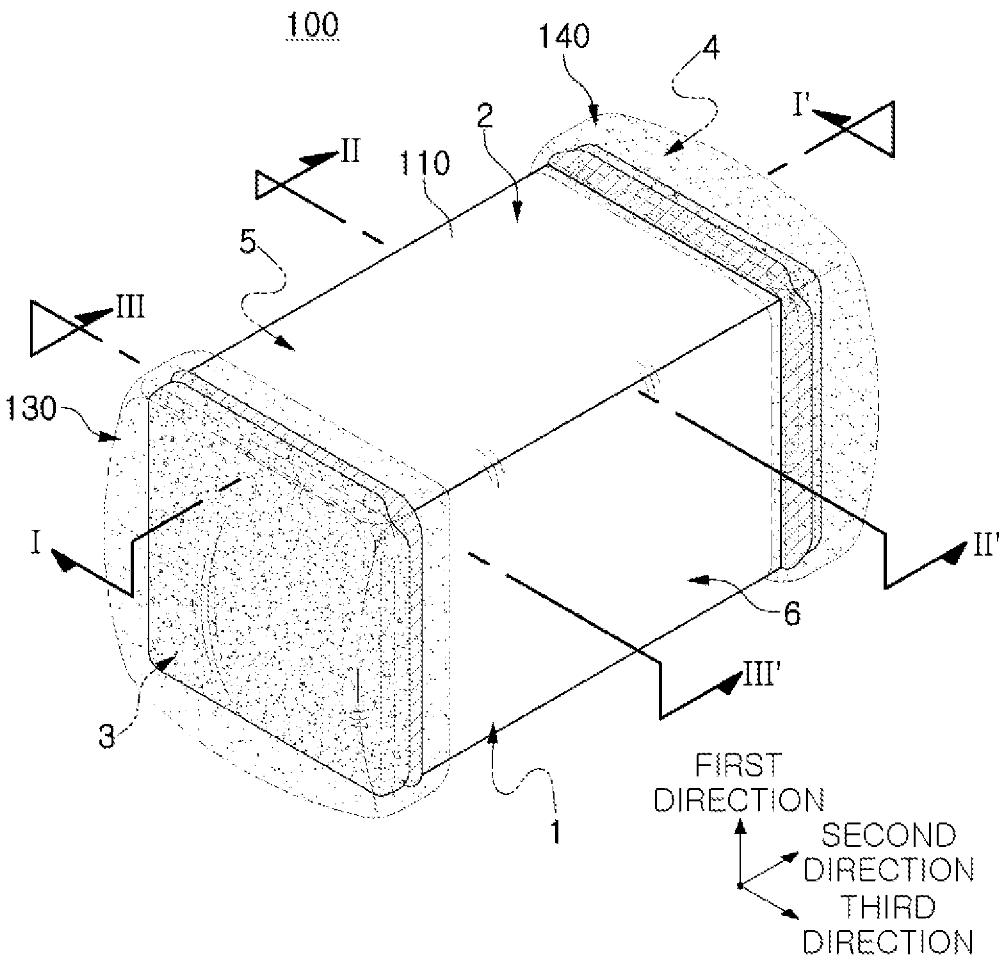
FIG. 1 is a perspective view schematically illustrating a multilayer electronic component according to an example embodiment of the present disclosure.

Hereinafter, embodiments of the present disclosure will be described with reference to specific example embodiments and the attached drawings. The embodiments of the present disclosure may, however, be exemplified in many different forms and should not be construed as being limited to the specific embodiments set forth herein. The example embodiments disclosed herein are provided for those skilled in the art to better explain the present disclosure. In the drawings, the shapes and dimensions of elements may be exaggerated for clarity, and the same reference numerals will be used throughout to designate the same or like elements.

In addition, in order to clearly describe the present disclosure in the drawings, the contents unrelated to the description are omitted, and since sizes and thicknesses of each component illustrated in the drawings are arbitrarily shown for convenience of description, the present disclosure is not limited thereto. In addition, components with the same function within the same range of ideas are described using the same reference numerals. Throughout the specification, when a certain portion "includes" or "comprises" a certain component, this indicates that other components are not excluded and may be further included unless otherwise noted.

In the drawings, a first direction may be a direction in which first and second internal electrodes are alternately disposed with a dielectric layer interposed therebetween, or a thickness T direction, and among a second direction and a third direction, perpendicular to the first direction, the second direction may be defined as a longitudinal (L) direction L, and the third direction may be defined as a width (W) direction.

Figure 3:
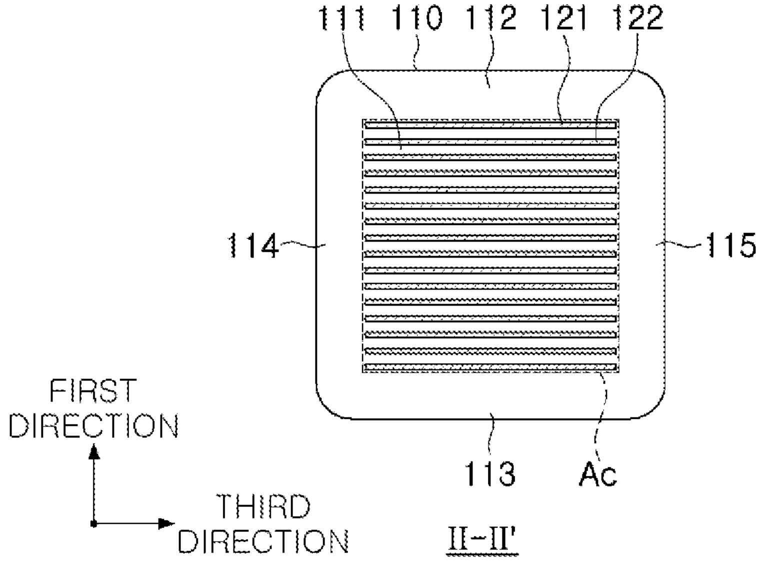
FIG. 3 is a cross-sectional view taken along line II-II' in FIG. 1.

FIG. 3 is a cross-sectional view taken along line II-II' in FIG. 1.

Figure 4:
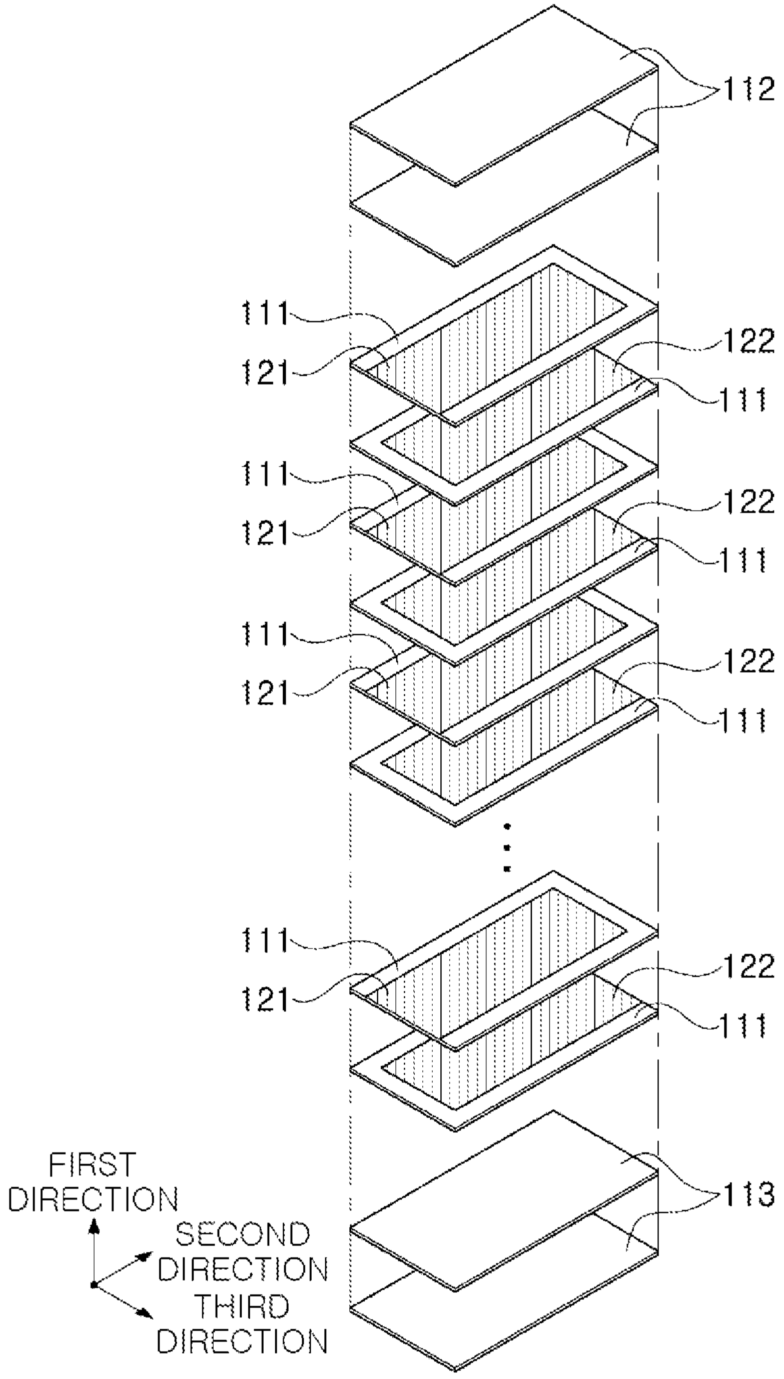
FIG. 4 is an exploded perspective view illustrating a body according to an example embodiment.

FIG. 4 is an exploded perspective view illustrating a body according to an example embodiment.

Figure 5:
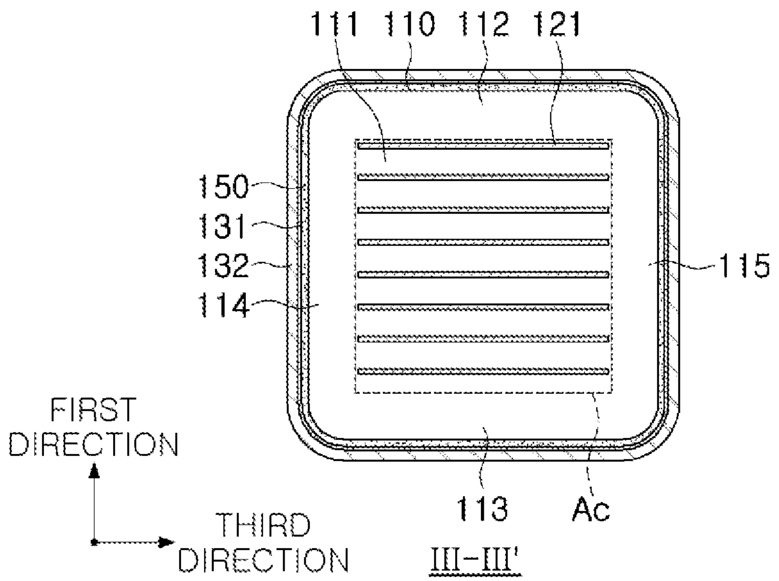
FIG. 5 is a cross-sectional view taken along line III-III' in FIG. 1.

FIG. 5 is a cross-sectional view taken along line III-III' in FIG. 1.

Figure 2:
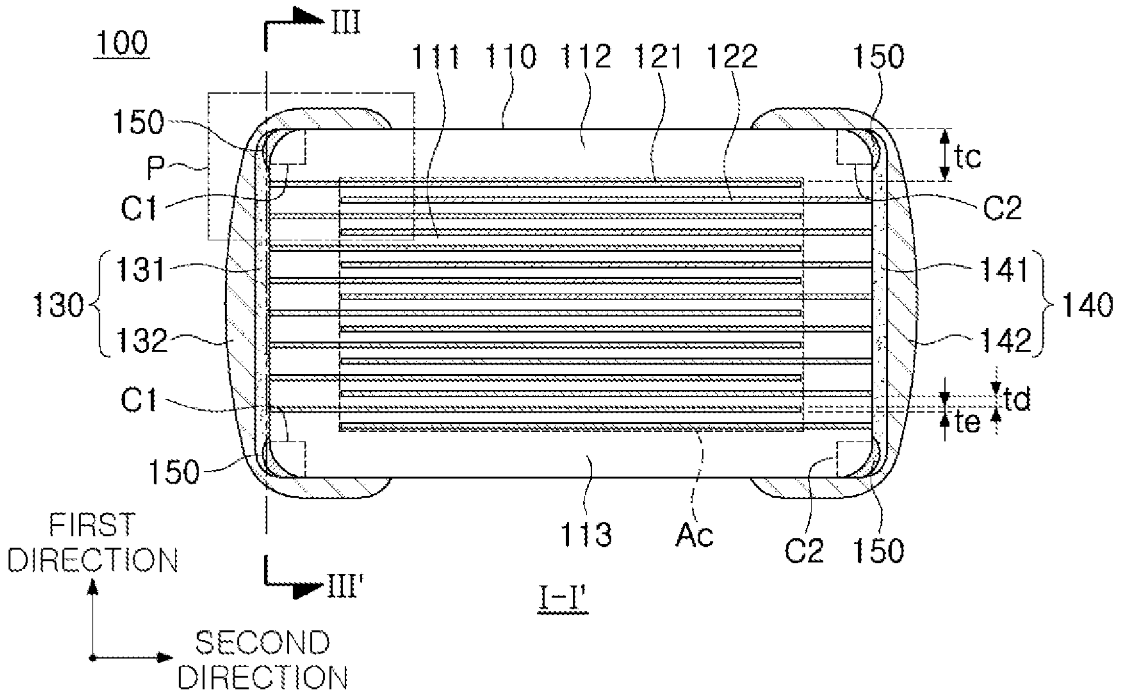
FIG. 2 is a cross-sectional view taken along line I-I' in FIG. 1.
Figure 6:
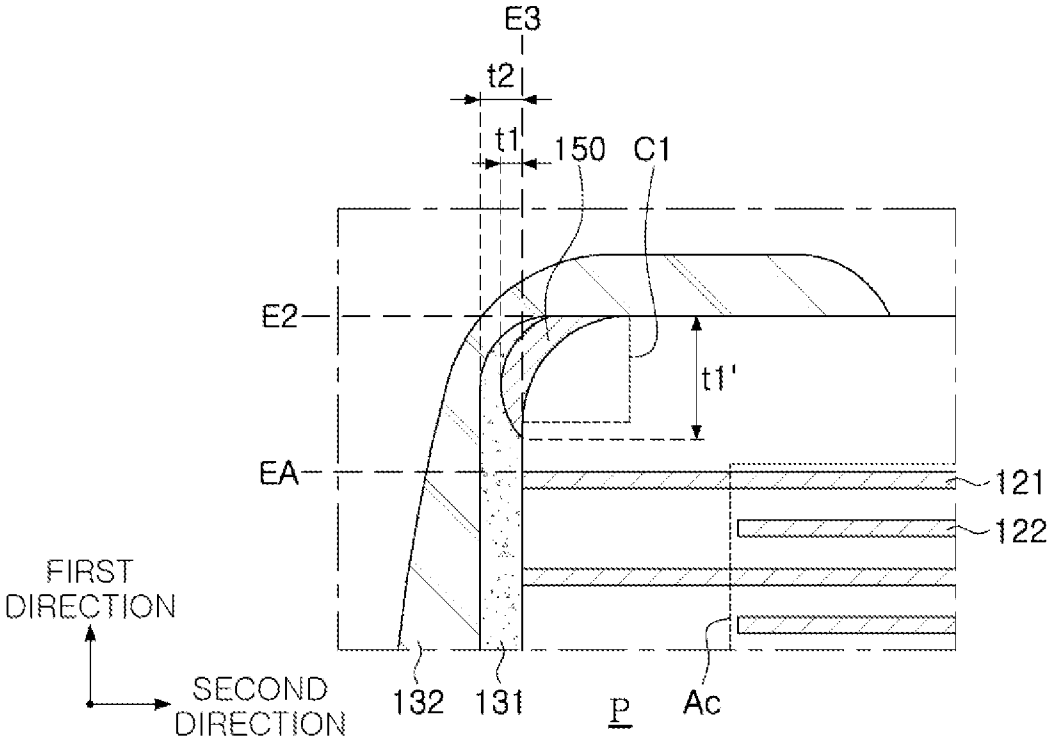
FIG. 6 is an enlarged view of region P in FIG. 2.

FIG. 6 is an enlarged view of region P in FIG. 2.

Figure 7A:
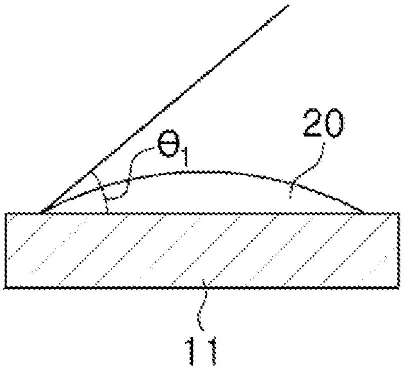
FIGS. 7A and 7B are each a schematic diagram schematically illustrating a contact angle with glass according to a type of metal.
Figure 7B:
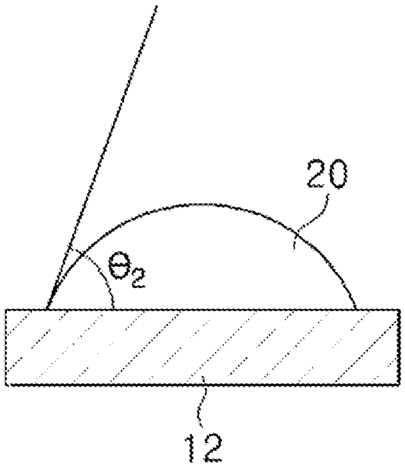

FIGS. 7A and 7B are each a schematic diagram schematically illustrating a contact angle with glass according to a type of metal.

Figure 8:
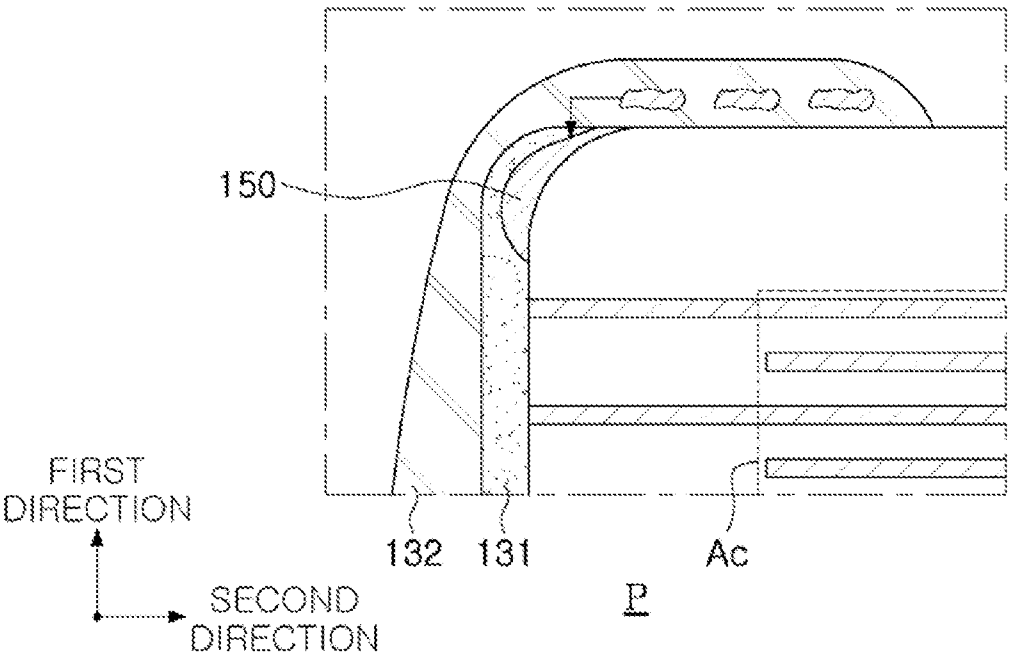
FIG. 8 schematically illustrates a mechanism by which a protective layer is formed according example embodiment of the present disclosure.

FIG. 8 schematically illustrates a mechanism by which a protective layer is formed according to an example embodiment of the present disclosure.

Figure 9:
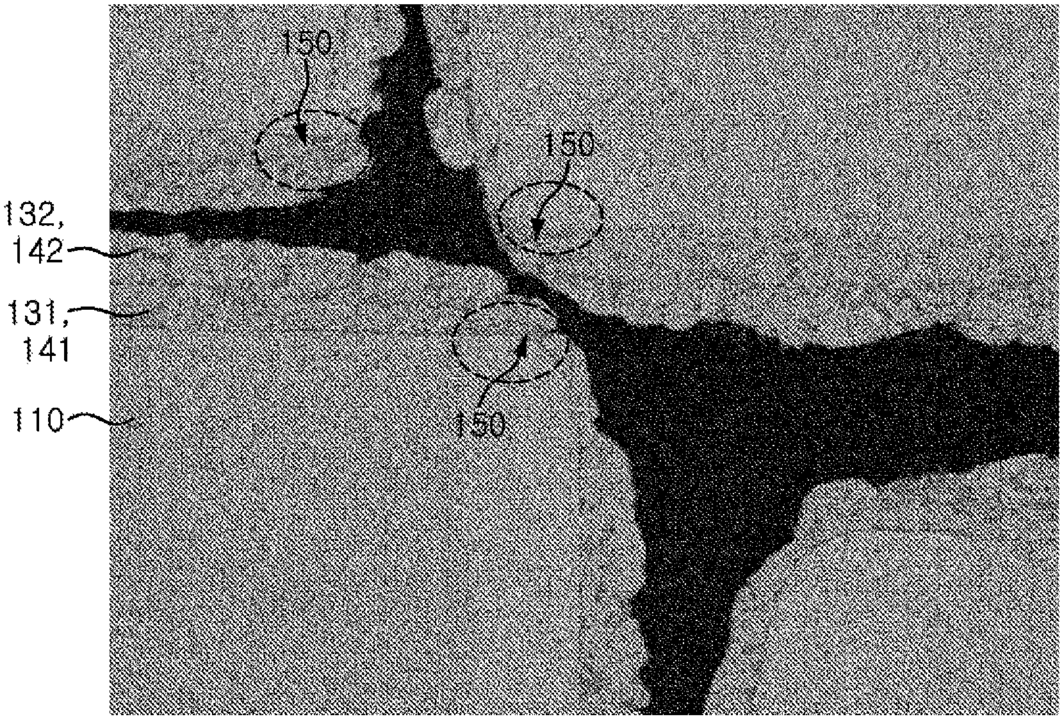
FIG. 9 is an image of a region in which a protective layer is formed according to an example embodiment of the present disclosure, captured by using a scanning electron microscope in first and third cross-sections of a multilayer electronic component.

FIG. 9 is an image of a region in which a protective layer is formed according to an example embodiment of the present disclosure, captured by using a scanning electron microscope in first and third cross-sections of a multilayer electronic component.

Figure 10A:
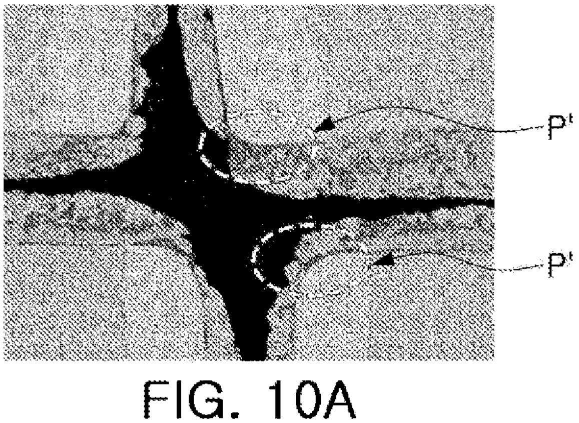
FIGS. 10A to 10C are each an image of mapping a region in which a protective layer according to an example embodiment of the present disclosure is formed through an electron probe X-ray micro analyzer (EPMA)
Figure 10B:
Figure 10C:
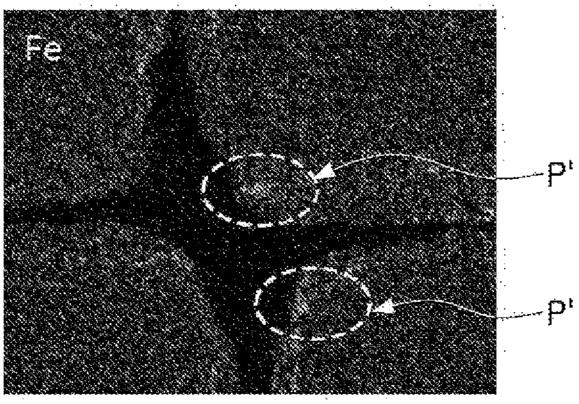

FIGS. 10A to 10C are each an image of mapping a region in which a protective layer according to an example embodiment of the present disclosure is formed through an electron probe X-ray micro analyzer (EPMA).

Figure 11:
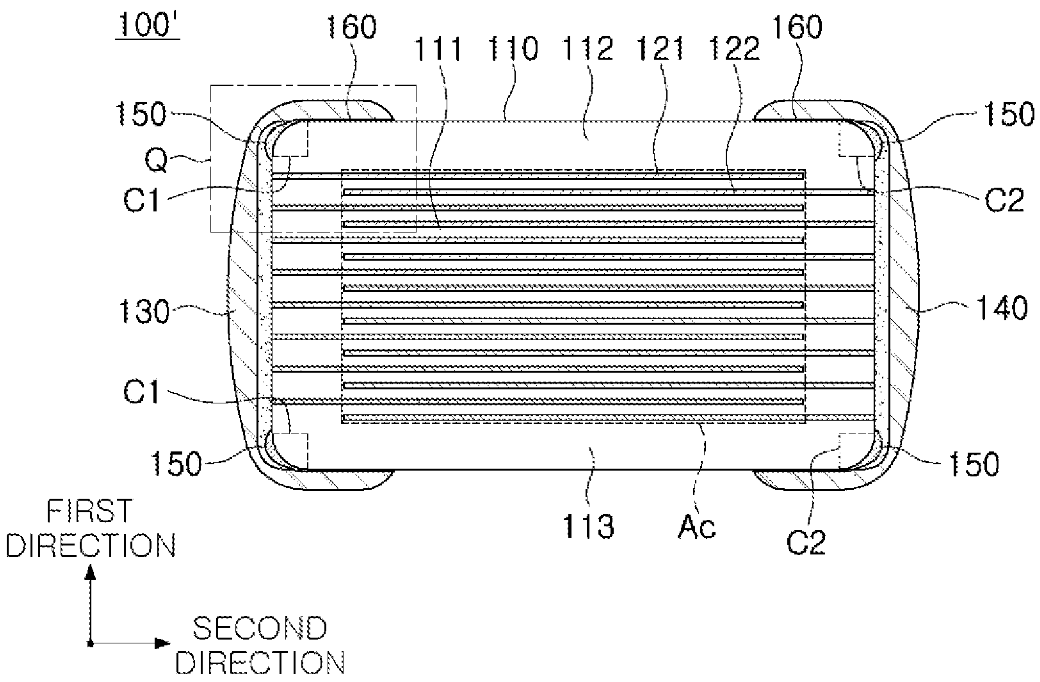
FIG. 11 is a cross-sectional view in first and second directions in which a multilayer electronic component according to an example embodiment is polished up to a center portion in a third direction.

FIG. 11 is a cross-sectional view in first and second directions in which a multilayer electronic component according to an example embodiment is polished up to a center portion in a third direction.

Figure 12:
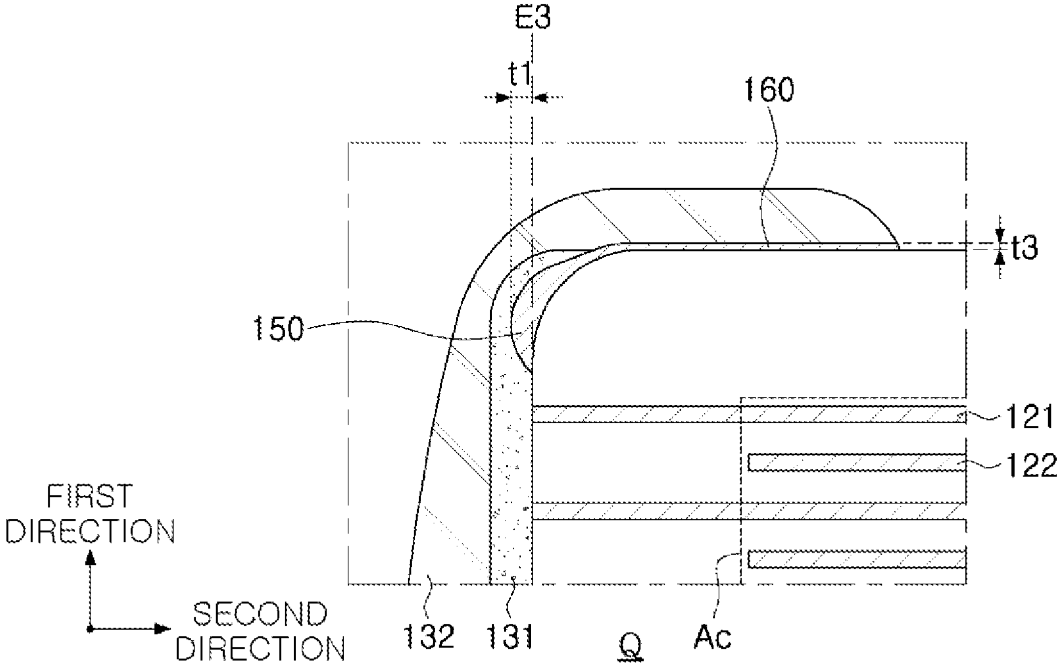
FIG. 12 is an enlarged view of region Q in FIG. 11.

FIG. 12 is an enlarged view of region Q in FIG. 11.

Figure 13:
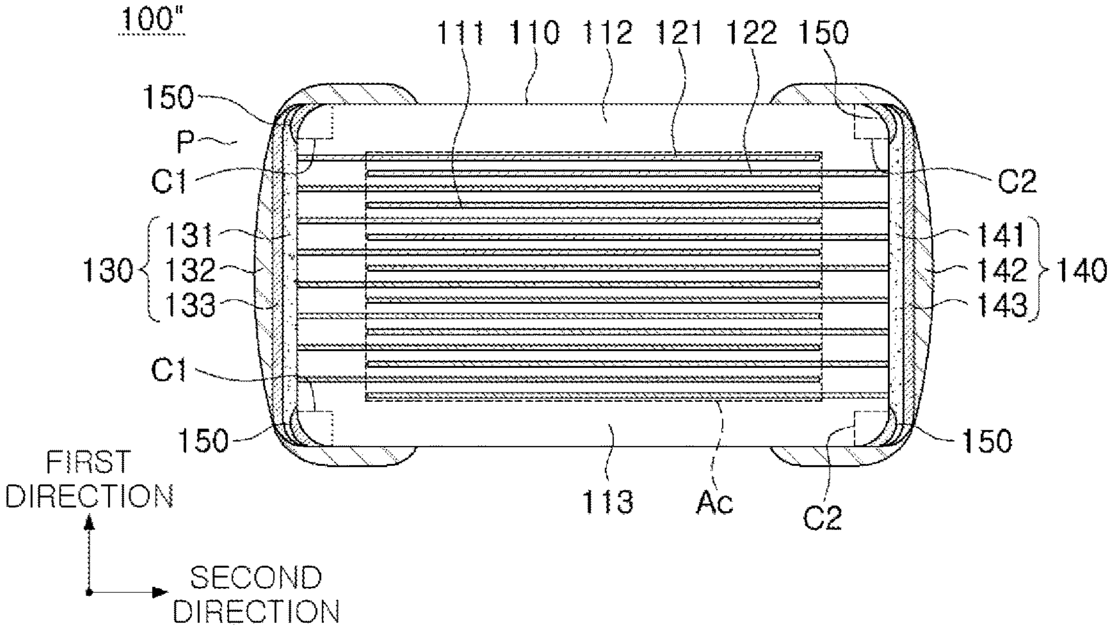
FIG. 13 is a cross-sectional view of first and second directions in which a multilayer electronic component according to an example embodiment is polished up to a center portion in a third direction.

FIG. 13 is a cross-sectional view of first and second directions in which a multilayer electronic component according to an example embodiment is polished up to a center portion in a third direction.

Hereinafter, a multilayer electronic component 100 according to an example embodiment of the present disclosure and various example embodiments will be described in detail with reference to FIGS. 1 to 13.

A multilayer electronic component 100 according to an example embodiment of the present disclosure may include a dielectric layer 111 and first and second internal electrodes 121 and 122 alternately arranged with the dielectric layer 111 in a first direction, and may include: a body 110 including first and second surfaces 1 and 2 opposing each other in the first direction, third and fourth surfaces 3 and 4 connected to the first and second surfaces and opposing each other in a second direction, and fifth and sixth surfaces 5 and 6 connected to the first and fourth surfaces and opposing each other in a third direction; and external electrodes 130 and 140 disposed on the third surface and the fourth surface, respectively. The body 110 may include a first corner C1 for connecting the third surface to the first, second, fifth, and sixth surfaces, and a second corner C2 for connecting the fourth surface to the first, second, fifth, and sixth surfaces, the first external electrode may include a first-first electrode layer 131 disposed on the third surface and the first corner, and a first-second electrode layer 132 disposed on the first-first electrode layer and disposed to extend to a portion of the first, second, fifth, and sixth surfaces, the second external electrode may include a second-first electrode layer 141 disposed on the fourth surface and the second corner, and a second-second electrode layer 142 disposed on the second-first electrode layer and disposed to extend to a portion of the first, second, fifth, and sixth surfaces, a protective layer 150 including glass may be disposed between the first-first electrode layer and the first corner and between the second-first electrode layer and the second corner, and the protective layer may be spaced apart from a straight line for connecting an end close to the fourth surface among ends of the first internal electrode and a straight line for connecting an end close to the third surface among ends of the second internal electrode. In some embodiments, the protective layer may be disposed to be spaced apart from: (i) an extension line extending along the first direction and from a first end of the first internal electrode, the first end is closer to the fourth surface than to the third surface, and (ii) an extension line extending along the first direction and from a second end of the second internal electrode, the second end is closer to the third surface than to the fourth surface.

A multilayer electronic component 100 according to an example embodiment of the present disclosure may include a dielectric layer 111 and first and second internal electrodes 121 and 122 alternately arranged with the dielectric layer 111 in the first direction, and may include: a body 110 including first and second surfaces 1 and 2 opposing each other in the first direction, third and fourth surfaces 3 and 4 connected to the first and second surfaces and opposing each other in the second direction, and fifth and sixth surfaces 5 and 6 connected to the first to fourth surfaces and opposing each other in the third direction; and external electrodes 130 and 140 disposed on the third surface and the fourth surface, respectively. The external electrode may include first electrode layers 131 and 141 disposed on the third and fourth surfaces to come into contact with an end of the internal electrode in the second direction and including Ni, and second electrode layers 132 and 142 disposed to extend from the first electrode layer to a portion of the first, second, fifth, and sixth surfaces and including Cu. A protective layer 150 including glass may be disposed between the end of the first electrode layer, and the body, and the glass may include Na and Fe.

A multilayer electronic component 100 according to an example embodiment of the present disclosure may include a dielectric layer 111 and first and second internal electrodes 121 and 122 alternately arranged with the dielectric layer 111 in the first direction, and may include: a body 110 including first and second surfaces 1 and 2 opposing each other in the first direction, third and fourth surfaces 3 and 4 connected to the first and second surfaces and opposing each other in a second direction, and the fifth and sixth surfaces 5 and 6 connected to the first to fourth surfaces and opposing each other in a third direction; and external electrodes 130 and 140 disposed on the third surface and the fourth surface, respectively. The external electrode may have first electrode layers 131 and 141 disposed on the third and fourth surfaces to come into contact with an end of the internal electrode in the second direction, and second electrode layers 132 and 142 disposed to extend from the first electrode layer to a portion of the first, second, fifth, and sixth surfaces. A protective layer 150 including glass may be disposed between the end of the first electrode layer and the body. The first electrode layer may include a first conductive metal, and the second electrode layer may include a second conductive metal and glass. The wettability of the glass included in the second electrode layer with respect to the first conductive metal may be greater than that of the glass included in the second electrode layer with respect to the second conductive metal.

The body 110 includes a dielectric layer 111 and internal electrodes 121 and 122 alternately arranged with the dielectric layer 111.

There is no particular limitation to a specific shape of the body 110, but as illustrated, the body 110 may be formed in a hexahedral shape or a shape similar thereto. Due to the contraction of ceramic powder particles included in the body 110 during a sintering process, the body 110 may not have a hexahedral shape with a complete straight line, but may have a substantially hexahedral shape.

The body 110 may have first and second surfaces 1 and 2 opposing each other in a first direction, third and fourth surfaces 3 and 4 connected to the first and second surfaces 1 and 2 and opposing each other in a second direction, fifth and sixth surfaces 5 and 6 connected to the first and second surfaces 1 and 2 and connected to the third and fourth surfaces 3 and 4, and opposing each other in a third direction.

Referring to FIG. 2, the body 110 may include a first corner C1 for connecting the third surface 3 to the first, second, fifth, and sixth surfaces 1, 2, 5 and 6, and a second corner C2 for connecting the fourth surface 4 to the first, second, fifth, and sixth surfaces 1, 2, 5 and 6. The first and second corners C1 and C2 may be formed by contraction behavior in a sintering process of the body 110 due to an occurrence of a step portion caused by thicknesses of the internal electrodes 121 and 122 as margin regions in which the internal electrodes 121 and 122 are not disposed to on overlap each other the dielectric layer 111. Alternatively, the first and second corners C1 and C2 may be formed by performing a rounding treatment on corners for connecting each side of the body 110 through a separate process in order to prevent poor chipping.

On the other hand, the body 110 may have a substantially hexahedral shape, but each side forming a hexahedron may not actually be made in the form of a complete plane. That is, an actual shape of each surface constituting the body 110 may be a curved surface having roughness. Accordingly, the first to sixth surfaces 1, 2, 3, 4, 5 and 6 of the body 110 defined in the present disclosure may refer to virtual surfaces assuming that each surface constituting the body 110 is a substantially flat surface. According to such a definition, the first corner C1 may be defined as a curved surface for connecting the third surface 3 to the first, second, fifth, and sixth surfaces 1, 2, 5 and 6, assumed as a flat surface, and the second corner C2 may be defined as a curved surface for connecting the fourth surface 4 to the first, second, fifth, and sixth surfaces 1, 2, 5 and 6, assumed as a flat surface.

Furthermore, the first corner C1 and the second corner C2 may be defined in a relationship between a capacitance formation portion Ac described below and the body 110. Hereinafter, referring to FIG. 6, another example of defining the first corner C1 will be described, but the same may be understood in the case of the second corner C2.

Referring to FIG. 6, the first corner C1 may refer to a connection line of the body 110 for connecting an extension line of the capacitance formation portion Ac in the first direction and an extension line of the capacitance formation portion Ac in the second direction in any cross-sections of the multilayer electronic component 100 in the first direction and the second direction. Here, the extension line of the capacitance formation portion Ac in the first direction may refer to an extension line of a line for connecting a second directional end (e.g., an end along the second direction) of the second internal electrode 122, and the extension line of the capacitance formation portion Ac in the second direction may refer to a second directional extension line of the internal electrode disposed at a first directional end. When the definition of the first corner C1 is extended to a three-dimensional solid rather than an arbitrary first and second directional cross-section, the first corner C1 may be a surface for connecting a region overlapping the capacitance formation portion Ac in the first direction or the third direction, among one surface and the other surface a surface corresponding to a region in contact with the first internal electrode 121 in the first direction among one surface of the body 110 in the second direction, and among one surface and the other surface facing the surface corresponding thereto in the third direction. Similarly, the second corner C2 may be a surface for connecting a region overlapping the capacitance formation portion Ac in the first direction or the third direction, among one surface and the other surface facing, in the first direction, a surface corresponding to a region in contact with the second internal electrode 122 among the other surface of the body 110 in the second direction and a surface corresponding to a region in contact with the first internal electrode 121 among one surface of the body 110 in the second direction, and among one surface and the other surface facing the surfaces corresponding thereto in the third direction.

A plurality of dielectric layers 111 forming the body 110 may be sintered, and boundaries between adjacent dielectric layers 111 may be integrated so as to be difficult to determine without using a scanning electron microscope (SEM).

A raw material forming the dielectric layer 111 is not particularly limited as long as it may obtain sufficient capacitance. For example, a barium titanate-based material, a lead composite perovskite-based material, or a strontium titanate-based material may be used. The barium titanate-based material may include $BaTiO_3$-based ceramic powder particles, and an example of the ceramic powder particles may include $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0\leq x<1$, $0<y<1$) or $Ba(Ti_{1-y}Zr_y)O_3$ ($0<y<1$) which is formed by partially embodying Ca (calcium), Zr (zirconium), and the like in $BaTiO_3$.

Furthermore, in the raw forming the material dielectric layer 111, various ceramic additives, organic solvents, binders, and dispersants may be added to powder particles such as barium titanate ($BaTiO_3$) according to the purpose of the present disclosure.

Meanwhile, an average thickness td of the dielectric layer 111 does not need to be particularly limited. For example, an average thickness td of the dielectric layer 111 may be 0.2 μm or more and 2 μm or less, and the average thickness td of the dielectric layer 111 may be 0.35 μm or less to more easily achieve high capacity and miniaturization of the multilayer electronic component 100.

The average thickness td of the dielectric layer 111 may refer to an average thickness td of the dielectric layer 111 disposed between the first and second internal electrodes 121 and 122.

The average thickness td of the dielectric layer 111 may be measured by scanning an image with a scanning electron microscope (SEM) of 10,000× magnification of a length and thickness direction (L-T) cross-section of the body 110. Other methods and/or tools appreciated by one of ordinary skill in the art, even if not described in the present disclosure, may be used for the measurement. For example, the average value may be measured by measuring thicknesses of one dielectric layer in the scanned image at 30 points which are spaced from each other at equal intervals in a longitudinal direction. The 30 points spaced from each other at equal intervals may be designated in the capacitance formation portion Ac. Furthermore, when the average value is measured by extending an average measurement up to 10 dielectric layers, an average thickness of the dielectric layers may be further generalized.

Referring to FIG. 2, a body 110 may include a capacitance formation unit Ac in which capacitance is formed by including a first internal electrode 121 and a second internal electrode 122 alternately disposed with a dielectric layer 111 interposed therebetween, and cover portions 112 and 113 disposed on one surface and the other surface of the capacitance formation unit Ac in the first direction, which are disposed inside the body 110.

Furthermore, the capacitance formation unit Ac contributes to forming the capacitance of a capacitor and may be formed by repeatedly stacking a plurality of first and second internal electrodes 121 and 122 with the dielectric layer 111 interposed therebetween.

The cover portions 112 and 113 may be formed by stacking a single dielectric layer or two or more dielectric layers on one surface and the other surface of the capacitance formation portion Ac in the first direction, respectively, and may basically prevent damage to the internal electrode due to physical or chemical stress.

Furthermore, the cover portions 112 and 113 do not include internal electrodes and may include the same material as the dielectric layer 111.

Meanwhile, an average thickness of the cover portions 112 and 113 does not need to be particularly limited. However, in order to more easily achieve miniaturization and high capacitance of the multilayer electronic component, an average thickness tc of the cover portions 112 and 113 may be 15 μm or less.

An average thickness of the cover portions 112 and 113 may refer to a first directional size (distance along the first direction), and may be a value obtained by averaging the first directional sizes (distance) of the cover portions 112 and 113 measured at five points which are spaced apart from each other at equal intervals in an upper or lower portion of the capacitance formation portion Ac.

Referring to FIG. 3, margin portions 114 and 115 may be disposed on one surface and the other surface of the capacitance formation portion Ac in the third direction.

The margin portions 114 and 115 may include a margin portion 114 disposed on a fifth surface 5 of a body 110 and a margin portion 115 disposed on a sixth surface 6 thereof. That is, the margin portions 114 and 115 may be disposed on both end surfaces of the body 110 in the third direction (i.e., a width direction).

As illustrated, the margin portions 114 and 115 may refer to a region between boundary surfaces of both ends of the first and second internal electrodes 121 and 122 and the body 110.

The margin portions 114 and 115 may basically serve to prevent damage to an internal electrode due to physical or chemical stress.

The margin portions 114 and 115 may be formed by applying a conductive paste to a ceramic green sheet except for a part in which the margin portion is formed and forming an internal electrode.

Furthermore, in order to suppress a step portion caused by the internal electrodes 121 and 122, the internal electrodes may be cut to be exposed to fifth and sixth surfaces 5 and 6 of the body after they are stacked, and then, a single dielectric layer or two or more dielectric layers may be stacked on both side surfaces of the capacitance formation unit Ac in the third direction (i.e., the width direction), thereby forming the margin portions 114 and 115.

Meanwhile, a width of the margin portions 114 and 115 does not need to be particularly limited. However, in order to more easily achieve miniaturization and high capacitance of the multilayer electronic component, an average width of the margin portions 114 and 115 may be 15 μm or less.

The average width of the margin portions 114 and 115 may refer to an average size of the margin portions 114 and 115 in the third direction, and may be an average value of the third direction size (size along the third direction) of the margin portions 114 and 115 measured at five points which are spaced apart at equal intervals on a side surface of the capacitance formation portion Ac.

The internal electrodes 121 and 122 are alternately arranged with the dielectric layer 111 in the first direction.

The internal electrodes 121 and 122 may include first and second internal electrodes 121 and 122. The first and second internal electrodes 121 and 122 are alternately disposed to face each other with the dielectric layer 111 forming the body 110 interposed therebetween, and may be connected to third and fourth surfaces 3 and 4 of the body 110, respectively. Specifically, one end of the first internal electrode 121 may be connected to the third surface, and one end of the second internal electrode 122 may be connected to the fourth surface. That is, in an example embodiment, the internal electrodes 121 and 122 may be in contact with the third surface 3 or the fourth surface 4.

As illustrated in FIG. 2, the first internal electrode 121 may be spaced apart from the fourth surface 4 and may be exposed through the third surface 3, and the second internal electrode 122 may be spaced apart from the third surface 3 and may be exposed through the fourth surface 4. A first external electrode 130 may be disposed on the third surface 3 of the body and may be connected to the first internal electrode 121, and a second external electrode 140 may be disposed on the fourth surface 4 of the body and may be connected to the second internal electrode 122.

That is, the first internal electrode 121 is connected to the first external electrode 130 without being connected to the second external electrode 140, and the second internal electrode 122 is connected to the second external electrode 140 without being connected to the first external electrode 130. Accordingly, the first internal electrode 121 may be formed to be spaced apart from the fourth surface 4 by a predetermined distance, and the second internal electrode 122 may be formed to be spaced apart from the third surface 3 by a predetermined distance. In this case, the first and second internal electrodes 121 and 122 may be electrically separated from each other by a dielectric layer 111 disposed in the middle thereof.

Referring to FIG. 4, a body 110 may be formed by alternately stacking a ceramic green sheet on which a first internal electrode 121 is printed and a ceramic green sheet on which a second internal electrode 122 is printed, and then sintering the stacked ceramic green sheets.

A material forming the internal electrodes 121 and 122 is not particularly limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

Furthermore, the internal electrodes 121 and 122 may be formed by printing a conductive paste for internal electrodes, including at least one of nickel (Ni), copper (Cu), palladium (Pd), silver (Ag), gold (Au), platinum (Pt), tin (Sn), tungsten (W), titanium (Ti), and alloys thereof, on a ceramic green sheet. A screen printing method or a gravure printing method may be used as a printing method of the conductive paste for internal electrodes, and the present disclosure is not limited thereto.

Referring to FIGS. 1 and 2, external electrodes 130 and 140 may be disposed on the body 110. The external electrodes 130 and 140 may include a first external electrode 130 disposed on the third surface 3 of the body 110 and a second external electrode 140 disposed on the fourth surface 4 of the body 110. Although the present disclosure describes a structure in which the multilayer electronic component 100 has two external electrodes 130 and 140, the number or shape of the external electrodes 130 and 140 may vary depending on the shape of the internal electrodes 121 and 122.

Conventionally, in a multilayer electronic component, a primary electrode of an external electrode (i.e., a first electrode layer of the present disclosure) may be formed by mixing a conductive metal and glass. In this case, the glass may serve to promote low-temperature sintering during a sintering process and filling pores between conductive metal particles, and may serve to improve interfacial bonding force between the body and external electrodes which are mainly comprised of Ba and Ti. However, the conductive metal and the glass, mainly comprised of ceramic materials, do not have sufficient wettability, and accordingly, an interface portion between the conductive metal and the glass may be a path for penetration of external moisture.

Furthermore, depending on a manufacturing method, the primary electrode may be formed on a corner of the body to have a thinner thickness than a peripheral region, and a boundary portion between the primary electrode and the corner of the body may be a main path for penetration of a plating solution or external moisture. Accordingly, structural improvement is required to improve the reliability of multilayer electronic components by blocking the path for the penetration of external moisture.

Accordingly, in the present disclosure, a protective layer including glass may be disposed between an end of the first electrode layer in contact with one end of the internal electrode and the body 110, thereby blocking a path for penetration of external moisture, a plating solution, and hydrogen and improving the moisture resistance reliability of the multilayer electronic component 100.

Hereinafter, various embodiments of first electrode layers 131 and 141, second electrode layers 132 and 142, and a protective layer 150 included in external electrodes 130 and 140 in multilayer electronic components 100, 100' and 100" according to an example embodiment of the present disclosure and examples thereof will be described in detail.

In an example embodiment, the external electrodes 130 and 140 may be disposed on the third surface and the fourth surface 3 and 4, respectively.

Specifically, the external electrodes 130 and 140 may include first electrode layers 131 and 141 disposed on the third and fourth surfaces 3 and 4 to come into contact with an end of the internal electrodes 121 and 122 in the second direction, and second electrode layers 132 and 142 disposed to extend from the first electrode layers 131 and 141 to a portion of first, second, fifth, and sixth surfaces.

The first electrode layers 131 and 141 may be disposed on the third and fourth surfaces 3 and 4, respectively, to come into contact with ends of the internal electrodes 121 and 122 in the second direction, respectively. Specifically, the first electrode layer may include a first-first electrode layer 131 disposed on the third surface 3 and in contact with a second directional end of the first internal electrode 121, and a second-first electrode layer 141 disposed on the fourth surface 4 and in contact with a second directional end of the second internal electrode 122.

On the other hand, when the body 110 has a shape including the first corner C1 and the second corner C2 described above, the first electrode layer 131 and 141 may be divided into a first-first electrode layer 131 disposed on the third surface 3 and the first corner C1, and a second-first electrode layer 141 disposed on the fourth surface 4 and the second corner C2. However, the first-first electrode layer 131 does not need to cover all of the first corner C1, and the second-first electrode layer 141 also does not need to cover all of the second corner C2.

The first electrode layers 131 and 141 may not be disposed on the first surface 1 and the second surface 2. Accordingly, since the proportion of the external electrodes 130 and 140 in the multilayer electronic component 100 may be reduced, the capacitance per unit volume of the multilayer electronic component 100 may be improved.

The first electrode layers 131 and 141 may include a conductive metal. The conductive metal included in the first electrode layers 131 and 141 may be referred to as a first conductive metal.

The first conductive metal may be Ni. Accordingly, when the internal electrodes 121 and 122 include Ni, the electrical connectivity of the external electrodes 130 and 140 and the internal electrodes 121 and 122 may be improved, and when the second electrode layers 132 and 142 include Cu, a phenomenon of generating cracks by allowing Cu to diffuse to the internal electrodes may be suppressed.

On the other hand, when the first conductive metal is Ni, a sintering temperature may be relatively higher than a sintering temperature when the first conductive metal is Cu, making make it difficult to form a dense electrode layer, which may make it difficult to improve the sealing property of the multilayer electronic component 100. However, according to an example embodiment of the present disclosure, since a protective layer including glass is disposed between ends of the first electrode layers 131 and 141 and the body 110, moisture resistance reliability of the multilayer electronic component 100 may be improved even when the first electrode layers 131 and 141 include Ni that may result in making it difficult to form a dense electrode layer. That is, when the first conductive metal included in the first electrode layers 131 and 141 is Ni, the effect of improving moisture resistance reliability according to the present disclosure may be more remarkable.

The first electrode layers 131 and 141 may include glass in addition to the first conductive metal. The component of the glass included in the first electrode layers 131 and 141 is not particularly limited, but the glass may include at least one of Ba and Zn.

The second electrode layers 132 and 142 may be disposed on the first electrode layers 131 and 141. The second electrode layers 132 and 142 may be disposed to extend from the first electrode layers 131 and 141 to a portion of the first, second, fifth, and sixth surfaces 1, 2, 5 and 6. Accordingly, the bending strength the multilayer electronic component 100 may be improved.

Meanwhile, when the body 110 has a shape in which the body 110 includes the first corner C1 and the second corner C2 described above, the second electrode layers 132 and 142 may be a first-second electrode layer 132 disposed on the first-first electrode layer 131 and extending to a portion of the first, second, fifth, and sixth surfaces 1, 2, 5 and 6, and a second-second electrode layer 142 disposed on the second-first electrode layer 141 and extending to a portion of the first, second, fifth, and sixth surfaces 1, 2, 5 and 6. The first-second electrode layer 132 and the second-second electrode layer 142 may be spaced apart from each other to prevent a short circuit.

The second electrode layers 132 and 142 may include a conductive metal. The conductive metal included in the second electrode layers 132 and 142 may be referred to as a second conductive metal.

The second conductive metal may be Cu, but the present disclosure is not limited thereto, and the second conductive metal may further include metal elements having excellent electrical conductivity and mechanical strength.

The second electrode layers 132 and 142 may include glass in addition to the second conductive metal. The component of the glass included in the second electrode layers 132 and 142 is not particularly limited, but the glass may include at least one of Na and Fe, thereby easily forming a difference between wettability of the first conductive metal of the glass included in the second electrode layers 132 and 142 described below and wettability of the second conductive metal of the glass included in the second electrode layers 132 and 142. In some embodiments of the application, the glass may be free of Na.

The glass included in the second electrode layers 132 and 142 may include various elements in addition to one or more of Na and Fe. For example, the glass may further include at least one of B, Si, Al, Si, Al, Li, K, Na, Ba, Ca, Sr, Fe, Zn, Ni, Sn, Ag, Cu, In, Mn, Ti, Ge, P, and Co. In this case, when B is included as a main component in the second electrode layers 132 and 142, the glass at a low temperature may form a liquid phase, thereby accelerating the sintering of Cu.

In an example embodiment, the wettability of the glass included in the second electrode layers 132 and 142 with respect to the first conductive metal may be higher than the wettability of the glass included in the second electrode layers 132 and 142 with respect to the second conductive metal. Accordingly, as illustrated in FIG. 8, the glass included in the second electrode layers 132 and 142 may penetrate through the ends of the first electrode layers 131 and 141 while moving to a boundary surface between the ends of the first electrode layers 131 and 141 and the body 110. Accordingly, a protective layer 150 including the glass may be disposed between the ends of the first electrode layers 131 and the body 110.

The wettability of the glass with respect to the conductive metal may be expressed as a contact angle between the glass and the conductive metal. Referring to FIGS. 7A and 7B, in a glass having the same composition, a contact angle with respect to Ni and a contact angle with respect to Cu may be different from each other. In this case, it may be seen that the larger the contact angle, the lower the wettability, and the smaller the contact angle, the higher the wettability. Specifically, a contact angle θ1 of a glass sample 20 with respect to a Ni sample 11 is smaller than a contact angle θ2 of the glass sample 20 with respect to a Cu sample 12. This denotes that the wettability of the glass sample 20 with respect to the Ni sample 11 is greater than the wettability of the glass sample 20 with respect to the Cu sample 12.

A magnitude relationship between the wettability of the glass included in the second electrode layers 132 and 142 with respect to the first conductive metal and the wettability of the glass included in the second electrode layers 132 and 142 with respect to the second conductive metal may be determined by comparing contact angles between the glass and the conductive metal. That is, in an example embodiment, when an average contact angle of the glass included in the second electrode layers 132 and 142 with respect to the first conductive metal is a first angle, and an average contact angle of the glass included in the second electrode layers 132 and 142 with respect to the second conductive metal is a second angle, the first angle may be smaller than the second angle. In this case, an absolute value of a difference between the first angle and the second angle may be 10 degrees or more and 50 degrees or less, thereby securing a sufficient wettability difference to form the protective layer 150 according to the present disclosure.

In the present disclosure, there is no particular limitation to a method for measuring an average contact angle for the first conductive metal of the glass included in the second electrode layers 132 and 142, and an average contact angle for the second conductive metal of the glass included in the second electrode layers 132 and 142. For example, after a glass sample having the same composition as a glass included in the second electrode layers 132 and 142 is applied to a first sample formed under the same composition and sintering condition as the first electrode layers 131 and 141 and a second sample formed under the same composition and sintering condition as the second electrode layers 132 and 142, a static contact angle may be measured using a contact angle meter at a measurement temperature within the range of 630° C. to 830° C. When an average value is obtained after performing the contact angle measurement on five or more identical samples, an average contact angle for the first conductive metal of the glass included in the second electrode layers 132 and 142 and an average contact angle for the second conductive metal of the glass included in the second electrode layers 132 and 142 may be measured. Other methods and/or tools appreciated by one of ordinary skill in the art, even if not described in the present disclosure, may be used for the measurement.

The protective layer 150 may be disposed between the ends of the first electrode layers 131 and 141 and the body 110, and may include glass.

Referring to FIG. 2, cross-section III-III' according to FIG. 5 may be a cross-section obtained by cutting an area adjacent to the first corner C1 of the body 110 in the first direction. Referring to FIG. 5, the body 110 in the cross-section III-III' may be in contact with the protective layer 150, and the first electrode layer 131 and the second electrode layer 132 may be sequentially disposed on the protective layer 150. Accordingly, the protective layer 150 may cover the first corner C1 of the body 110 vulnerable to penetration of moisture, a plating solution and hydrogen, thereby improving the moisture resistance reliability of the multilayer electronic component 100.

Referring to FIG. 9, it may be seen that the protective layer 150 may be disposed between the ends of the first electrode layers 131 and 141 and the body 110, and it may be confirmed that when a corner of the body 110 has a shape including a corner having a round shape, the protective layer 150 is disposed between corners of the first electrode layers 131 and 141.

Here, a distance between the ends of the first electrode layers 131 and 141 and the body 110 may denote a distance between a first-first electrode layer 131 and a first corner C1, and a distance between a second-first electrode layer 141 and a second corner C2. That is, in an example embodiment, a protective layer 150 including the glass may be disposed between the first-first electrode layer 131 and the first corner C1 and between the second-first electrode layer 141 and the second corner C2.

On the other hand, when the body 110 has a structure including the first and second corners C1 and C2, the protective layer 150 may be continuously disposed on the first corner C1, and may be continuously disposed on the second corner C2, but the present disclosure is not limited thereto, and some disconnected regions may be formed. Furthermore, the protective layer may be thinner on a corner for connecting two surfaces of the first to sixth surfaces (1, 2, 3, 4, 5 and 6) on a triple point for connecting three surfaces of the first to sixth surfaces (1, 2, 3, 4, 5 and 6) of the body 110.

As in an example embodiment, when the body 110 has a structure including first and second corners C1 and C2, the first and second corners C1 and C2 may form a microstructure that is more vulnerable to penetration of moisture, a plating solution and hydrogen due to shrinkage. However, according to an example embodiment of the present disclosure, since the protective layer including the glass is disposed between the first-first electrode layer 131 and the first corner C1 and between the second-first electrode layer 141 and the second corner C2, even when the body 110 includes the first and second corners C1 and C2, the moisture resistance reliability of the multilayer electronic component 100 may be improved.

On the other hand, the protective layer 150 may be formed to sufficiently cover the first and second corners C1 and C2 to improve the moisture resistance reliability, but if the protective layer 150 is formed excessively, it may be difficult to improve the capacitance per unit volume of the multilayer electronic component 100. Accordingly, the protective layer 150 may be spaced apart from a straight line for connecting an end close to the fourth surface 4 among ends of the first internal electrode 121 and a straight line for connecting an end close to the third surface 3 among ends of the second internal electrode 122.

On the other hand, the protective layer 150 may have sufficient thickness to improve the moisture resistance reliability, but the protective layer 150 must not penetrate through the second electrode layers 132 and 142. Furthermore, the protective layer 150 must not be disposed adjacent to the capacitance formation portion Ac. That is, in an example embodiment, an average size (distance) t1' from an extension line E2 of the second surface to a first directional end (e.g., the end extending along the first direction and disposed on the third surface) of the protective layer 150 disposed on the first corner C1 may be 0.1 μm or more and 10 μm or less. Furthermore, in an example embodiment, an average size (distance) t1 from an extension line E3 of the third surface to a second directional end (e.g., the end extending along the second direction and disposed on the second surface) of the protective layer 150 disposed on the first corner C1 may be less than twice an average thickness t2 of the first-first electrode layer 131.

In a similar aspect, in an example embodiment, the protective layer 150 may be spaced apart from the capacitance formation portion Ac, and in an example embodiment, the protective layer 150 may be disposed so as not to exceed the internal electrodes 121 and 122 disposed on an uppermost end and a lowermost end in the first direction among the internal electrodes 121 and 122.

A method for measuring an average size t1' from the extension line E2 of the second surface to a first directional end of the protective layer 150 disposed on the first corner C1, an average size t1 from the extension line E3 of the third surface to a second directional end of the protective layer 150 disposed on the first corner C1, and an average thickness t2 of the first-first electrode layer 131 is not particularly limited. For example, after polishing the multilayer electronic component 100 up to a center thereof in the third direction to expose first and second directional cross-sections thereof, a first directional size from the extension line E2 of the second surface to a first directional end of the protective layer 150 disposed on the first corner C1 may be measured as t1', a second directional size from the extension line E3 of the third surface to a second directional end disposed on the first corner C1 may be measured as t1, and a second directional size from an extension line of the third surface 3 to a second directional end of the first-first electrode layer 131 may be measured as t2. In this case, t2 may be measured on a level equal to or less than a second directional extension line EA of an internal electrode disposed at the first directional end among the internal electrodes 121 and 122.

On the other hand, t1 and t1' may be further generalized by obtaining an average value measured in first and second directional cross-sections polished by a ⅓ point in the second direction and first and second direction cross-sections polished by a ⅔ point, and t2 may be further generalized by obtaining an average value of values measured at any five or more points in the first direction. SEM or other methods and/or tools appreciated by one of ordinary skill in the art, even if not described in the present disclosure, may be used for the measurement.

Meanwhile, as described above, the protective layer 150 may be formed by moving glass included in the second electrode layers 132 and 142 during a sintering process. In this case, the glass included in the second electrode layers 132 and 142 may go through a process of sintering the body 110, a process of applying and sintering the first electrode layers 131 and 141, and a process of applying the second electrode layers 132 and 142, and then, in a process of sintering the second electrode layers 132 and 142 and performing a separate thermal treatment, the glass may move to a position in which the protective layer 150 of the present disclosure is formed. The phenomenon may occur more smoothly when the first electrode layers 131 and 141 include Ni and the second electrode layers 132 and 142 include Cu.

Referring to FIG. 11, in a multilayer electronic component 100' according to an example embodiment, when second electrode layers 132 and 142 include glass, at least a portion of the glass 160 included in the second electrode layers 132 and 142 may be disposed between the second electrode layers 132 and 142 and first and second surfaces 1 and 2.

In this case, referring to FIG. 12, an average size t1 from an extension line of a third surface 3 or a fourth surface 4 to a second directional end of the protective layer 150 may be 1.01 or more and 50 or less as compared to an average thickness t3 of a glass 160 disposed between the second electrode layers 132 and 142 and the first and second surfaces 1 and 2. Accordingly, it may be possible to more effectively cover an interface between the body 110 and ends of the first electrode layers 131 and 141 as a portion vulnerable to moisture resistance reliability in the multilayer electronic component 100'.

Meanwhile, when the body 110 has a shape including the first corner C1 and the second corner C2 described above, an average size t1 from an extension line E3 of the third surface to a second directional end of the protective layer disposed on the first corner C1 may be 1.01 or more and 50 or less as compared to an average thickness t3 of the glass 160 disposed between first-second and second-second electrode layers 132 and 142 and the first and second surfaces 1 and 2.

Meanwhile, the average thickness t3 of the glass 160 disposed between the first-second and second-second electrode layers 132 and 142 and the first and second surfaces 1 and 2 may be measured as a first directional size from a first directional end of the glass 160 to a first directional end of the body in contact with the glass 160 after the multilayer electronic component 100 is polished to a central portion thereof in the third direction to expose the first and second directional cross-sections. The measurement of a value of the t3 may be further generalized by measuring values at any five or more points in the second direction and then obtaining an average value thereof.

Referring to FIG. 13, external electrodes 130 and 140 of the multilayer electronic component 100" according to an example embodiment may further include additional electrode layers 133 and 143 disposed between first electrode layers 131 and 141 and second electrode layers 132 and 142. The additional electrode layers 133 and 143 may not be disposed on the first and second surfaces 1 and 2 of the body 110 like the first electrode layers 131 and 141 according to an example embodiment. Accordingly, it may be easier for this structure to thin the external electrodes 130 and 140 than a structure in which the external electrodes 130 and 140 include only the first electrode layers 131 and 141 and the second electrode layers 132 and 142.

The glass included in the protective layer 150 may be formed by moving the glass included in the second electrode layers 132 and 142, as described above. That is, the glass included in the protective layer 150 may include at least one of Na and Fe.

The content of Na and Fe included in the protective layer 150 is not particularly limited. For example, an average content of Na may be 1.25 wt % or more and 15.65 wt % or less, and an average content of Fe may be 0.15 wt % or more and 5.45 wt % or less. In this case, the content of Na and Fe may be a value compared to the content of Cu included in the multilayer electronic component, and specifically, the content of Na and Fe may be a value compared to the content of Cu included in the second electrode layers 132 and 142 or the additional electrode layers 133 and 143.

Hereinafter, an example of a method for measuring the content of Na and Fe included in the protective layer 150 will be described. First, in the first and second directional cross-sections of the multilayer electronic component polished up to the central portion of the third direction, after sampling a region of the external electrode disposed on the corner of the body (see FIG. 10A), the distribution and composition of elements is analyzed with an electron probe micro analyzer (EPMA) and then mapped (see FIG. 10B and FIG. 10C), and a region in which Na and Fe are locally concentrated is designated as a formation region of the protective layer 150. Then, an average content of Na and Fe may be measured by designating any five points in a region 5 μm×5 μm in the center of the formation region of the protective layer 150, the average content of Cu may be measured by designating any five points in the region 5 μm×5 μm of the center of the second electrode layers 132 and 142 or the additional electrode layers 133 and 143 adjacent to the protective layer 150, and then, a ratio thereof may be calculated, thereby measuring the average content of Na and Fe included in the protective layer 150 as compared to Cu included in the second electrode layers 132 and 142 or the additional electrode layers 133 and 143. Other methods and/or tools appreciated by one of ordinary skill in the art, even if not described in the present disclosure, may be used for the measurement.

Meanwhile, referring to FIGS. 10B and 10C, it may be seen that at least one of Na and Fe is locally agglomerated in the region in which the protective layer 150 is formed.

In an example embodiment, Fe included in the glass included in the protective layer 150 may be in the form of an oxide including Fe, for example, Fe may be in the form of $FeO_x$ (where x is a positive rational number excluding 0), and more specifically, it may be in the form of $Fe_3O_4$.

The protective layer 150 may be disposed between the ends of the first electrode layer 131 and 141, vulnerable to penetration of moisture, a plating solution and hydrogen, and the body 110, thereby suppressing the penetration of moisture, a plating solution, and hydrogen into the capacitance formation portion Ac. Accordingly, the moisture resistance reliability of the multilayer electronic component 100 may be improved.

Hereinafter, the present disclosure will be described in more detail through experimental examples, but the scope of the present disclosure is not limited by the experimental examples because this is to help detailed understanding of the present disclosure.

Experimental Example 1

① Example

A first electrode layer according to the example was formed using an external electrode paste in which glass components are mixed with Ni as the main phase. The glass components were added in the form of glass powder particles, and a size of the glass powder particles was 0.1 to 5 μm based on D50, and Ba—Zn-based glass (where Na and Fe were not added) was added as a glass.

A second electrode layer according to the example was formed using an external electrode paste in which glass components were mixed with Cu as the main phase. The glass components were added in the form of glass powder particles, and a size of the glass powder particles was 0.1 to 5 μm based on D50, and glass to which Na and Fe were added was mixed at 1% to 40% by weight compared to a total weight of Cu.

For each electrode layer, a first electrode layer and a second electrode layer were sequentially applied to a polished chip with a prepared paste, and heat treatment was performed at 400° C. or higher, thereby manufacturing a pre-sintered chip. Thereafter, Ni and Sn plating layers were formed on a surface of the second electrode layer of the pre-sintered chip.

② Comparative Example

A first electrode layer according to the comparative example was formed under the same composition and conditions as the first electrode layer according to the embodiment. However, unlike the second electrode layer according to the Example, the second electrode layer according to the comparative example used Ba—Zn-based glass (where Na and Fe were not added), not a glass to which Na and Fe were added. The rest of the conditions are the same.

Table 1 below shows whether the protective layer 150 as in the present disclosure were formed according to a pre-sintering temperature and the type of glass, and characteristics are evaluated accordingly.

Regarding whether the protective layer was formed, in first and second directional cross-sections polished to the center of the multilayer electronic component in the third direction, after sampling a region of the external electrode disposed on the corner of the body (see FIG. 10A), the distribution and composition of elements were analyzed with an electron probe micro analyzer (EPMA) and then mapped, and when the content of Na is measured as 1.25 wt % or more as compared to the total element included in the protective layer 150, or the content of Fe is measured as 0.15 wt % or more as compared to the total element included in the protective layer 150, the protective layer 150 was determined as a good product (e.g., the protective layer 150 was formed). The analysis was conducted in a total of 100 samples.

Regarding an evaluation of hydrogen penetration during plating, before forming a Ni plating layer and a Sn plating layer, by measuring a difference between the amount of hydrogen generated in a pre-sintered chip state formed up to the protective layer 150 and the amount of hydrogen generated in a complete chip state after forming the Ni and Sn plating layers, when the difference was within 2 ppm, it was determined as a good product. The amount of hydrogen generated was measured through a hydrogen analyzer by burning a pre-fired chip and a complete chip, and measured at three lots for each pre-sintering temperature.

A moisture resistance severity evaluation was conducted in a 1.5 Vr environment at a temperature of 95° C. and a relative humidity of 95% for 20 hours, and when a value of the insulation resistance (IR) decreases by 2 orders or more of an initial value, it was determined as be defective, and non-defective cases were determined as good products, which was conducted in a total of 1200 samples.

In Table 1, a case in which the number of good products is less than YYY % is indicated as X, a case in which the number of good products is more than YYY % and less than 60% is indicated as Δ, a case in which the number of good products is 60% or more and 90% or less is indicated as o, and a case in which the number of good products is more than 90% and 100% or less is indicated as ◎.

TABLE 1

| | Pre-sintering temperature (° C.) | Whether protective layer was formed | Amount of hydrogen penetration during plating | Moisture Resistance Severity Evaluation |
|---|---|---|---|---|
| Comparative Example | 400 | X | X | X |
| | 450 | X | X | X |
| | 500 | X | X | X |
| | 550 | X | X | X |
| | 600 | X | X | X |
| | 650 | X | X | X |
| | 700 | X | X | Δ |
| | 750 | X | X | ○ |
| | 800 | X | X | ○ |
| | 850 | X | X | ◎ |
| Example | 400 | Δ | Δ | Δ |
| | 450 | ○ | ○ | Δ |
| | 500 | ◎ | ◎ | ○ |
| | 550 | ◎ | ◎ | ◎ |
| | 600 | ◎ | ◎ | ◎ |
| | 650 | ◎ | ◎ | ◎ |
| | 700 | ◎ | ◎ | ◎ |
| | 750 | ◎ | ◎ | ◎ |
| | 800 | ◎ | ◎ | ◎ |
| | 850 | ◎ | ◎ | ◎ |

Referring to the comparative example, it may be seen that as the pre-sintering temperature increases, a frequency of an occurrence of good products increases in the moisture resistance severity evaluation increases. However, the moisture resistance to a plating solution may be configured not to be good. When the pre-sintering temperature is improved to improve the reliability of the moisture resistance severity evaluation, it is believed to be the result of the formation of glass beading on a second electrode layer.

Referring to the example, it may be seen that the protective layer 150 according to the present disclosure was formed, and even when the pre-sintering temperature is 550° C. or more, the frequency of an occurrence of good products is 90% or more in the moisture resistance severity evaluation. Furthermore, it may be confirmed that moisture resistance to the plating solution may also be secured at a temperature of 500° C. or higher. This is believed to be a result of moving the glass included in the second electrode layer between the end of the first electrode layer and the boundary of the body, that is, a result of suppressing the glass beading of the glass included in the second electrode layer.

That is, when the glass included in the second electrode layer includes Na and Fe, as in an example embodiment of the present disclosure, the protective layer 150 as in an example embodiment of the present disclosure may be disposed between the end of the first electrode layer and the body, thereby ensuring the moisture resistance reliability to external moisture of the multilayer electronic components as well as effectively suppressing the penetration of a plating solution or hydrogen generated during formation of the plating solution.

Experimental Example 2

Figure 14:
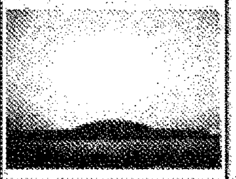
FIG. 14 is a comparison result illustrating a difference in contact angles for each sample according to a type of glass.
Figure 14:
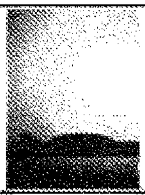
Figure 14:
Figure 14:
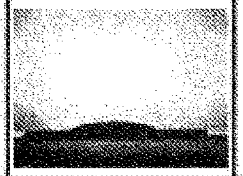
Figure 14:
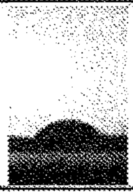
Figure 14:
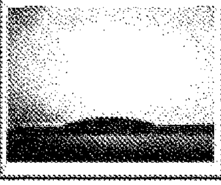

FIG. 14 illustrates a result of measuring a contact angle by applying glass according to the example and glass according to the comparative example to a Ni sample, a Cu sample, and a barium titanate (BT) sample.

The glass according to the example used an aluminumosilicate-based glass to which Na and Fe were added, and the glass according to the comparative example used a Ba—Zn-based glass (where Na and Fe are not added).

The Ni sample was prepared by adding Ni powder particles and a binder, molding the Ni powder particles and the binder by a predetermined thickness, and then sintering the same at a temperature of 1000° C. or higher. The Cu sample was prepared by adding Cu powder particles and a binder, molding the Cu powder particles and the binder by a predetermined thickness, and then sintering the same at a temperature of 800° C. or higher. The BT sample was prepared by adding $BaTiO_3$ and a dispersant to ceramic powder particles to prepare a green sheet, stacking and compressing several layers of the green sheet, cutting the stacked compressed layers by a predetermined thickness, and sintering the same at a temperature of 1,000° C. or higher.

The measurement of the contact angle is a result of measuring a static contact angle through a contact angle measuring device at any temperature in the range of 630° ° C. to 730° C., as illustrated in FIGS. 7A and 7B, after applying the glass according to the example and the glass according to the comparative example to the Ni sample, the Cu sample, and the BT sample, respectively, and contact angles were measured at the same temperature in all samples.

In the case of the comparative example, since there were similar contact angles with respect to Ni and Cu and there was a relatively high contact angle with respect to BT, the wettability for Cu and Ni was high and the wettability for BT was relatively low.

In the case of the example, there were relatively low contact angles with respect to Ni and BT and there was a relatively high contact angle with respect to Cu. That is, when the glass according to the example was included in the second electrode layer of the present disclosure, it may obtain driving force moving between the first electrode layer including Ni and the body including BT during the sintering process. Accordingly, the protective layer 150 including glass may be disposed between the ends of the first electrode layers 131 and 141 and the body 110 in the multilayer electronic components 100, 100' and 100".

The size of the multilayer electronic component 100 does not need to be particularly limited. According to the present disclosure, the multilayer electronic component can be applied to IT products having a small size because the multilayer electronic component is advantageous for miniaturization and high capacity, and the multilayer electronic component can also be applied to the size of products for use in automotive electronics that require high reliability because it may secure high reliability in various environments.

Meanwhile, a plating layer may be disposed on the second electrode layers 132 and 142 according to an example embodiment or an example of the present disclosure. The plating layer may serve to improve mounting properties or sealability. The type of plating layers is not particularly limited, and may be a plating layer including at least one of Ni, Sn, Pd, and alloys thereof, and may be formed of a plurality of layers.

For a more specific example of the plating layer, the plating layer may be a Ni plating layer or a Sn plating layer, and may have a form in which the Ni plating layer and the Sn plating layer are sequentially formed on the second electrode layers 132 and 142, or have a form in which the Sn plating layer, the Ni plating layer, and the Sn plating layer are sequentially formed. Furthermore, the plating layer may include a plurality of Ni plating layers and/or a plurality of Sn plating layers.

Although the embodiment of the present disclosure has been described in detail above, the present disclosure is not limited to the above-described embodiments and the accompanying drawings but is defined by the appended claims. Therefore, those of ordinary skill in the art may make various replacements, modifications, or changes without departing from the scope of the present invention defined by the appended claims, and these replacements, modifications, or changes should be construed as being included in the scope of the present disclosure.

In addition, the expression 'one embodiment' used in the present disclosure does not mean the same embodiment, and is provided to emphasize and explain different unique characteristics. However, the embodiments presented above do not preclude being implemented in combination with the features of another embodiment. For example, although items described in a specific embodiment are not described in another embodiment, the items may be understood as a description related to another embodiment unless a description opposite or contradictory to the items is in another embodiment.

In the present disclosure, the terms are merely used to describe a specific embodiment, and are not intended to limit the present disclosure. Singular forms may include plural forms as well unless the context clearly indicates otherwise.

What is claimed is:

1. A multilayer electronic component comprising:

a body comprising:

a dielectric layer; and first and second internal electrodes alternately arranged with the dielectric layer interposed therebetween in a first direction, wherein the body includes: first and second surfaces opposing each other in the first direction, third and fourth surfaces opposing each other in a second direction and connected to the first and second surfaces, fifth and sixth surfaces opposing each other in a third direction and connected to the first to fourth surfaces, a first corner connecting the third surface to the first, second, fifth, and sixth surfaces, and a second corner for connecting the fourth surface to the first, second, fifth and sixth surfaces;

a first external electrode disposed on the third surface, the first external electrode including a first-first electrode layer disposed on the third surface and the first corner, and a first-second electrode layer disposed on the first-first electrode layer and extends to a portion of the first, second, fifth, and sixth surfaces;

a second external electrode disposed on the fourth surface, the second external electrode including a second-first electrode layer disposed on the fourth surface and the second corner, and a second-second electrode layer disposed on the second-first electrode layer and extends to a portion of the first, second, fifth, and sixth surfaces; and a protective layer including a first glass and disposed between the first-first electrode layer and the first corner and between the second-first electrode layer and the second corner, wherein the protective layer is disposed to be spaced apart from: (i) an extension line extending along the first direction and from a first end of an outermost of the first internal electrodes, where the first end is closer to the fourth surface than to the third surface, and (ii) an extension line extending along the first direction and from a second end of an outermost of the second internal electrodes, where the second end is closer to the third surface than to the fourth surface.

2. The multilayer electronic component according to claim 1, wherein an average distance from an extension line of the second surface to a first directional end of the protective layer disposed on the first corner is 0.1 μm or more and 10 μm or less.

3. The multilayer electronic component according to claim 1, wherein an average distance from an extension line of the third surface to a second directional end of the protective layer disposed on the first corner is less than or equal to twice an average thickness of the first-first electrode layer.

4. The multilayer electronic component according to claim 1, wherein the first-second and second-second electrode layers include a second glass, and at least a portion of the second glass is disposed between a portion of a remainder of the first-second and second-second electrode layers and the first and second surfaces.

5. The multilayer electronic component according to claim 4, wherein an average distance from an extension line of the third surface to a second directional end of the protective layer disposed on the first corner is 1.01 or more and 50 or less as compared to an average thickness of the at least the portion of the second glass.

6. The multilayer electronic component according to claim 4, wherein the first-first and second-first electrode layers include a third glass including at least one of Ba and Zn, and the first-second and second-second electrode layers include a fourth glass including at least one of Na and Fe.

7. The multilayer electronic component according to claim 1, wherein the first glass includes at least one of Na and Fe.

8. The multilayer electronic component according to claim 7, wherein the first glass includes Fe.

9. The multilayer electronic component according to claim 1, wherein at least one of the first-second and second-second electrode layers include Cu, the first glass includes Na and Fe, an average content of Na included in the protective layer is 1.25 wt % or more and 15.65 wt % or less as compared to Cu included in the at least one of the first-second and second-second electrode layers, and an average content of Fe included in the protective layer is 0.15 wt % or more and 5.45 wt % or less as compared to Cu included in the at least one of the first-second and second-second electrode layers.

10. The multilayer electronic component according to claim 1, wherein the first-first and second-first electrode layers include Ni, and the first-second and second-second electrode layers include Cu.

11. The multilayer electronic component according to claim 1, wherein the first glass includes an oxide including Fe.

12. The multilayer electronic component according to claim 11, wherein the oxide including Fe is $FeO_x$, where x is a positive rational number excluding 0.

13. The multilayer electronic component according to claim 1, wherein the first external electrode may further include a first additional electrode layer disposed between the first-first electrode layer and the first-second electrode layer, and the second external electrode may further include a second additional electrode layer disposed between the second-first electrode layer and the second-second electrode layer.

14. The multilayer electronic component according to claim 13, wherein at least one of the first and second additional electrode layers include Cu and a fifth glass.

15. The multilayer electronic component according to claim 13, wherein a second directional end of the protective layer is disposed between the first-first electrode layer and the first additional electrode layer, and between the second-first electrode layer and the second additional electrode layer.

16. A multilayer electronic component comprising:

a body comprising:

a dielectric layer; and first and second internal electrodes alternately arranged with the dielectric layer in a first direction, wherein the body includes first and second surfaces opposing each other in the first direction, third and fourth surfaces opposing each other in a second direction and connected to the first and second surfaces, and fifth and sixth surfaces opposing each other in a third direction and connected to the first to fourth surfaces;

an external electrode disposed on the third and fourth surfaces, the external electrode including:

a first electrode layer including Ni and disposed on the third and fourth surfaces to come into contact with a second directional end of the first and second internal electrodes; and a second electrode layer including Cu and extending from the first electrode layer to a portion of the first, second, fifth, and sixth surfaces; and a protective layer including a first glass that includes at least one of Na and Fe, wherein the protective layer is disposed between an end of the first electrode layer and the body, wherein the first electrode layer includes a third glass including at least one of Ba and Zn, and the second electrode layer includes a fourth glass including at least one of Na and Fe.

17. The multilayer electronic component of claim 16, wherein the first electrode layer is not disposed on the first surface and the second surface.

18. The multilayer electronic component of claim 16, wherein the protective layer is disposed to be spaced apart from: (i) an extension line extending along the first direction and from a first end of the first internal electrode, where the first end is closer to the fourth surface than to the third surface, and (ii) an extension line extending along the first direction and from a second end of the second internal electrode, where the second end is closer to the third surface than to the fourth surface.

19. The multilayer electronic component of claim 16, wherein the second electrode layer includes a second glass, and at least a portion of the second glass is disposed between a portion of a remainder of the second electrode layer and the first and second surfaces.

20. The multilayer electronic component of claim 19, wherein an average distance from an extension line of the third surface or the fourth surface to a second directional end of the protective layer is 1.01 or more and 50 or less as compared to an average thickness of the at least the portion of the second glass.

21. The multilayer electronic component of claim 16, wherein the first glass includes Na and Fe.

22. The multilayer electronic component of claim 16, wherein the first glass includes an oxide including Fe.

23. The multilayer electronic component of claim 16, wherein the external electrode further includes an additional electrode layer disposed between the first electrode layer and the second electrode layer.

24. The multilayer electronic component of claim 23, wherein the additional electrode layer includes Cu and a fifth glass.

25. The multilayer electronic component of claim 24, wherein a second directional end of the protective layer is disposed between the first electrode layer and the additional electrode layer.

26. A multilayer electronic component comprising:

a body comprising:

a dielectric layer; and first and second internal electrodes alternately arranged with the dielectric layer in a first direction, wherein the body includes first and second surfaces opposing each other in the first direction, third and fourth surfaces opposing each other in a second direction and connected to the first and second surfaces, and fifth and sixth surfaces opposing each other in a third direction and connected to the first to fourth surfaces;

an external electrode disposed on the third and fourth surfaces, the external electrode including:

a first electrode layer including a first conductive metal and disposed on the third surface and the fourth surface to come into contact with a second directional end of the first and second internal electrodes; and a second electrode layer including a second conductive metal and a second glass, and extending from the first electrode layer to a portion of the first, second, fifth, and sixth surfaces; and a protective layer including a first glass disposed between the body and an end of the first electrode layer, wherein wettability of the second glass with respect to the first conductive metal is greater than that of the second glass with respect to the second conductive metal.

27. The multilayer electronic component of claim 26, wherein, when an average contact angle of the second glass with respect to the first conductive metal is a first angle, and an average contact angle of the second glass with respect to the second conductive metal is a second angle, the first angle is smaller than the second angle.

28. The multilayer electronic component of claim 27, wherein the protective layer is disposed to be spaced apart from: (i) an extension line extending along the first direction and from a first end of the first internal electrode, where the first end is closer to the fourth surface than to the third surface, and (ii) an extension line extending along the first direction and from a second end of the second internal electrode, where the second end is closer to the third surface than to the fourth surface.

29. The multilayer electronic component of claim 27, wherein an absolute value of a difference between the first angle and the second angle is 10 degrees or more and 50 degrees or less.

30. The multilayer electronic component of claim 26, wherein the first conductive metal is Ni and the second conductive metal is Cu.

31. The multilayer electronic component of claim 26, wherein the second glass includes at least one of Na and Fe.

32. The multilayer electronic component of claim 26, wherein the first electrode layer further includes a third glass, and the third glass includes at least one of Ba and Zn.

33. The multilayer electronic component of claim 26, wherein the first electrode layer is not disposed on the first surface and the second surface.

34. The multilayer electronic component of claim 26, wherein at least a portion of the second glass is disposed between a portion of a remainder of the second electrode layer and the first and second surfaces.

35. The multilayer electronic component of claim 34, wherein an average distance from an extension line of the third surface or the fourth surface to a second directional end of the protective layer is 1.01 or more and 50 or less as compared to an average thickness of the at least the portion of the second glass.

36. The multilayer electronic component of claim 26, wherein the first glass includes an oxide including Fe.

37. The multilayer electronic component of claim 26, wherein the external electrode further includes an additional electrode layer disposed between the first electrode layer and the second electrode layer.

38. The multilayer electronic component of claim 37, wherein the additional electrode layer includes Cu and a fourth glass.

39. The multilayer electronic component of claim 38, wherein a second directional end of the protective layer is disposed between the first electrode layer and the additional electrode layer.

40. A multilayer electronic component comprising:

a body comprising:

a dielectric layer; and first and second internal electrodes alternately arranged with the dielectric layer in a first direction;

an external electrode disposed on the body, the external electrode including:

a first electrode layer including a first conductive metal and disposed on the body to come into contact with a second directional end of the first and second internal electrodes; and a second electrode layer including a second conductive metal and a second glass, and disposed on the first electrode layer; and a protective layer disposed between an end of the first electrode layer and the body, wherein wettability of the second glass with respect to the first conductive metal is greater than that of the second glass with respect to the second conductive metal.

41. The multilayer electronic component of claim 40, wherein the first and second conductive metals are different.

42. The multilayer electronic component of claim 41, wherein the first conductive metal includes Ni.

43. The multilayer electronic component of claim 41, wherein the second conductive metal includes Cu.

44. The multilayer electronic component of claim 43, wherein an average content of Fe included in the protective layer is 0.15 wt % or more and 5.45 wt % or less as compared to Cu included in the second electrode layer.

45. A multilayer electronic component comprising:

a body comprising:

a dielectric layer; and first and second internal electrodes alternately arranged with the dielectric layer in a first direction;

an external electrode disposed on the body, the external electrode including:

a first electrode layer including a first conductive metal and disposed on the body to come into contact with a second directional end of the first and second internal electrodes; and a second electrode layer including a second conductive metal and a second glass, and disposed on the first electrode layer; and a protective layer including a first glass that includes Fe, wherein the protective layer is disposed between the body and an end of the first electrode layer, wherein wettability of the second glass with respect to the first conductive metal is greater than that of the second glass with respect to the second conductive metal.

46. The multilayer electronic component of claim 45, wherein the first conductive metal includes Ni.

47. The multilayer electronic component of claim 45, wherein the second conductive metal includes Cu.

48. The multilayer electronic component of claim 45, wherein an average content of Fe included in the protective layer is 0.15 wt % or more and 5.45 wt % or less as compared to Cu included in the second electrode layer.

49. The multilayer electronic component of claim 45, wherein the protective layer covers a corner of the body.

50. The multilayer electronic component of claim 45, wherein the first glass further includes Na.

* * * * *